United States Patent [19]

Morisawa et al.

[11] Patent Number: 4,793,217
[45] Date of Patent: Dec. 27, 1988

[54] METHOD AND APPARATUS FOR CONTROLLING POWER TRANSMITTING SYSTEM FOR AUTOMOTIVE VEHICLE, INCLUDING CONTINUOUSLY VARIABLE TRANSMISSION AND AUXILIARY TRANSMISSION

[75] Inventors: Kunio Morisawa; Michitaka Kakamu; Nobuyuki Kato, all of Toyota, Japan

[73] Assignee: Toyota Jidosha Kabushiki Kaisha, Aichi, Japan

[21] Appl. No.: 907,106

[22] Filed: Sep. 15, 1986

[30] Foreign Application Priority Data

Sep. 17, 1985 [JP] Japan .................. 60-205067
Dec. 11, 1985 [JP] Japan .................. 60-278533
Dec. 11, 1985 [JP] Japan .................. 60-278534

[51] Int. Cl.$^4$ .................................................. B60K 41/12
[52] U.S. Cl. ........................................ 74/866; 74/867
[58] Field of Search ............... 74/866, 867, 868, 869, 74/877, 689; 474/12, 18, 28

[56] References Cited

U.S. PATENT DOCUMENTS

| 4,458,318 | 7/1984 | Smit et al. ............... 74/866 X |
| 4,466,521 | 8/1984 | Hattori et al. .......... 74/866 X |
| 4,523,281 | 6/1985 | Noda et al. ............. 74/866 X |
| 4,549,447 | 10/1985 | Sakakibara .............. 74/689 |
| 4,589,071 | 5/1986 | Yamamuro et al. ..... 74/866 |
| 4,602,525 | 7/1986 | Moroto et al. .......... 74/689 |
| 4,610,183 | 9/1986 | Nobumoto et al. ..... 74/867 X |
| 4,627,308 | 12/1986 | Moroto et al. .......... 74/689 |
| 4,642,068 | 2/1987 | Osanai et al. ............ 474/28 X |
| 4,648,289 | 3/1987 | Kubo et al. ............. 74/866 |
| 4,649,486 | 3/1987 | Oshiage ................... 74/866 X |

FOREIGN PATENT DOCUMENTS 0104033 3/1984 European Pat. Off.
0139277 5/1985 European Pat. Off.

Primary Examiner—Lawrence J. Staab
Assistant Examiner—Dwight G. Diehl
Attorney, Agent, or Firm—Parkhurst, Oliff & Berridge

[57] ABSTRACT

A method and apparatus for controlling a power transmitting system for an automotive vehicle, including a continuously variable transmission (CVT) and an auxiliary transmission which is connected to the CVT and which is automatically shifted from one of two or more forward drive positions to the other depending upon operating conditions of the vehicle. To control the speed ratio of the CVT, a target speed of the input shaft of the CVT is determined according to one of different relationships between the target speed and at least one variable such as a currently required output of the engine. The relationships are stored in memory, corresponding to the forward drive positions of the auxiliary transmission. The appropriate relationship is selected depending upon the forward drive position in which the auxiliary transmission is currently placed while the transmission shift lever is in an auto-shift or engine-brake position. The automatic shift-down and shift-up operations of the auxiliary transmission may be effected according to predetermined shift patterns corresponding to drivability modes of the vehicle selected on a suitable drivability selector device.

9 Claims, 12 Drawing Sheets

FIG. 2

| SHIFT POSITIONS | | HIGH-RANGE CLUTCH 38 | LOW-RANGE BRAKE BAND 40 | REVERSE BRAKE BAND 42 | SPEED-RATIO Rf OF AUX. TRANSMISSION |
|---|---|---|---|---|---|
| FORWARD | LOW RANGE | × | ○ | × | $\left(1+\dfrac{\rho_1}{\rho_2}\right)=r$ |
| | HIGH RANGE | ○ | × | × | 1 |
| N (NEUTRAL) | | × | × | × | — |
| R (REVERSE) | | × | × | ○ | $-\left(1-\dfrac{1}{\rho_2}\right)$ |

METHOD AND APPARATUS FOR CONTROLLING POWER TRANSMITTING SYSTEM FOR AUTOMOTIVE VEHICLE, INCLUDING CONTINUOUSLY VARIABLE TRANSMISSION AND AUXILIARY TRANSMISSION

BACKGROUND OF THE INVENTION

1. Field of the Invention

The present invention relates to a method and apparatus for controlling a power transmitting system for an automotive vehicle, which includes a continuously variable transmission and an auxiliary transmission connected to the continuously variable transmission.

2. Discussion of the Related Art

A motor vehicle is known, which has a power transmitting system which includes a continuously variable transmission connected to an auxiliary transmission which has two or more forward drive gear positions. In this type of power transmitting system, the auxiliary transmission is automatically shifted from one of the forward drive positions to the other, depending upon the varying running conditions of the vehicle, for example, an opening angle of the throttle valve and a running speed of the vehicle. Further, the speed ratio of the continuously variable transmission is controlled so that the actual speed of the input shaft of the continuously variable transmission coincides with a target speed which is determined based on a currently required output of the engine and/or other variable or variables, according to a predetermined relationship between the target speed and the variable or variables. The predetermined relationship for determining the target speed of the input shaft of the continuously variable transmission for controlling its speed ratio, is used for all operating conditions of the vehicle, irrespective of the currently selected drive position of the auxiliary transmission, and/or the currently selected position of a shift lever or other selector device for selecting the operating mode of the auxiliary transmission. Such a predetermined relationship that should be used for determining the target speed is basically the same for all forward drive positions of the auxiliary transmission. Precisely, however, the relationship should be changed depending upon the selected forward drive position of the auxiliary transmission, since the range of variation in the overall speed ratio of the power transmitting system is varied depending upon the selected drive position of the auxiliary transmission.

When the auxiliary transmission of a power transmitting system of the type indicated above is shifted down from one drive position to another drive position of a lower speed range, the actual speed of the engine, or the actual speed of the input shaft of the continuously variable transmission is raised due to a difference between the speed ratios of the auxiliary transmission in the two drive positions of different speed ranges. However, the engine speed should not exceed its maximum permissible speed $Ne_{max}$. Therefore, the engine speed immediately before a shift-down operation of the auxiliary transmission must be lower than a predetermined upper limit n1 ($n1 = Ne_{max}/r$, if the speed ratio of a high-range position of the auxiliary transmission is 1, and where r represents the speed ratio of a low-range position of the auxiliary transmission). This means that the vehicle speed at which the auxiliary transmission is permitted to be shifted down must be relatively low, to avoid an excessive rise of the engine speed when the auxiliary transmission is shifted down. Accordingly, the vehicle tends to suffer from a relatively low level of drivability.

The conventional power transmitting system discussed above also suffers from inconveniences associated with a shift-down operation of the auxiliary transmission while a shift lever is placed in a low-speed or engine brake position. This position is provided to apply an engine brake to the vehicle or to obtain a boosted drive force. In this engine brake mode of the conventional system, the same relationship for determining the target speed of the input shaft of the continuously variable transmission is used before and after the auxiliary transmission is shifted from its high-range position to its low-range position. This does not permit a shift-down of the auxiliary transmission to provide an effective engine brake or a sufficiently large drive force to the vehicle. More particularly, the relationship used for determining the target speed must be prepared such that the engine speed will not rise beyond its maximum permissible speed $Ne_{max}$, immediately after the auxiliary transmission is shifted down. To this end, the relationship is determined so that the shift-down operation of the auxiliary transmission is initiated only after the vehicle speed has been lowered down to an upper limit at which the engine speed will exceed its maximum permissible level $Ne_{max}$ immediately after the auxiliary transmission has been shifted down to its low-range position. This also means that the engine speed immediately before the shift-down operation must be lower than a certain limit. The shift-down operation at relatively low vehicle speed and engine speed will not provide a sufficient engine brake, or a satisfactory level of drivability.

SUMMARY OF THE INVENTION

It is therefore a first object of the present invention to provide a method of controlling a power transmitting system of an automotive vehicle, wherein different relationships are used for determining the target speed of the input shaft of the continuously variable transmission, depending upon the currently selected forward drive positions of the auxiliary transmission.

A second object of the invention is the provision of such a method, wherein different relationships are used even for the same forward drive position of the auxiliary transmission, depending upon the currently selected position of a selector device for selecting an operating mode of the auxiliary transmission.

A third object of the invention is the provision of a method of controlling such a power transmitting system in which the auxiliary transmission is operable in an engine brake mode selected by the selector device, wherein different relationships are used for determining the target speed of the input shaft of the continuously variable transmission, depending upon the currently selected forward drive positions of the auxiliary transmission while in the engine brake mode.

A fourth object of the invention is to provide an apparatus for controlling a power transmitting system of an automotive vehicle which has a drivability selector for selecting one of a plurality of drivability modes of the vehicle, wherein the auxiliary transmission is automatically shifted from one of at least two forward drive positions thereof to the other, according to a set of shift-down and shift-up patterns which corresponds to the currently selected drivability mode of the vehicle.

The first object may be achieved according to one aspect of the present invention which provides a method of controlling a power transmitting system for an automotive vehicle, including a continuously variable transmission having an input shaft operatively connected to an engine of the vehicle, and further including an auxiliary transmission which is connected to the continuously variable transmission and which is automatically shifted from one of at least two forward drive positions thereof to the other depending upon operating conditions of the vehicle, comprising the steps of: (1) preparing a plurality of relationships of at least two variables which include a target speed of the input shaft of the continuously variable transmission, and a currently required output of the engine, the plurality of relationships corresponding to the at least two forward drive positions of the auxiliary transmission; (2) detecting currently selected one of the at least two forward drive positions of the auxiliary transmission; (3) selecting one of the plurality of relationships which corresponds to the detected currently selected forward drive position of the auxiliary transmission; (4) determining the target speed of the input shaft of the continuously variable transmission, according to the selected one of the plurality of relationships; and (5) controlling a speed ratio of the continuously variable transmission so that an actual speed of the input shaft coincides with the determined target speed.

According to the method of the invention described above, the appropriate one of the plurality of relationships is selected depending upon the currently selected one of the forward drive positions of the auxiliary transmission. The target speed of the input shaft of the continuously variable transmission is then determined based on at least the currently required output of the engine, and according to the selected relationship. According to the instant method, two different relationships are used for two forward drive positions of the auxiliary transmission, for example. In this case, the relationship for the drive position for a high speed range may be prepared so as to use the relatively lower target speeds, than the target speeds used for the drive position for a low speed range, where the currently required output of the engine, e.g., throttle opening angle, is relatively large. This arrangement contributes to enlarging the range of operating conditions of the vehicle within which the engine speed will not exceed the maximum permissible speed upon a shift-down operation of the auxiliary transmission. Therefore, the drivability of the vehicle is improved.

According to one advantageous feature of the invention, the above-indicated at least two forward drive positions of the auxiliary transmission includes a low-range position and a high-range position, and the step of preparing a plurality of relationships comprises preparing a low-range relationship and a high-range relationship which correspond to the low-range and high-range positions, respectively. The high-range relationship is adapted to determine the target speed to be lower than that determined according to the low-range relationship, while the low-range relationship is adapted to determine the target speed to be higher than that determined according to the high-range relationship.

The second object of the invention may be achieved according to another advantageous feature of the invention, in which the above-indicated at least two forward drive positions of the auxiliary transmission includes a high-range position, and the power transmitting system is provided with a selector device for selecting an operating mode of the auxiliary transmission. The selector device has a high-speed drive position in which the auxiliary transmission is always placed in the high-range position, and further has an auto-shift position in which the at least two forward drive positions are automatically selected. In this case, the step of preparing a plurality of relationships comprises preparing two different relationships which correspond to the high-range position, and the step of selecting one of the plurality of relationships comprises selecting one of the two different relationships when the high-range position is selected while the selector device is placed in the high-speed drive position, and selecting the other of the two different relationships when the high-range position is selected while the selector device is placed in the auto-shift position. According to this feature of the invention, the relationship for the high-range position with the selector device in the high-speed drive position may be prepared so as to use the relatively higher target speeds, than the target speeds used for the high-range position with the selector device in the auto-shift position. Since the relationship used for the high-speed drive mode may be prepared without considerations to eliminate the inconveniences enountered upon a shift-down operation of the auxiliary transmission in the the auto-shift mode, the vehicle may enjoy improved drivability in the high-speed drive mode.

The third object of the invention may be achieved according to another aspect of the invention which is adapted to a power transmitting system which is provided with a selector device for selecting an operating mode of the auxiliary transmission, the selector device having an engine brake position for shifting down the auxiliary transmission from one of the at least two forward drive positions to the other lower than the one drive position. According this aspect of the invention, the method comprises the steps of: (1) preparing a plurality of relationships of at least two variables which include a target speed of the input shaft of the continuously variable transmission, and a currently required output of the engine, the plurality of relationships corresponding to the at least two forward drive positions of the auxiliary transmission; (2) checking if the selector device is placed in the engine brake position; (3) if the selector device is placed in the engine brake position, detecting currently selected one of the at least two forward drive positions of the auxiliary transmission; (4) selecting one of the plurality of relationships which corresponds to the detected currently selected forward drive position of the auxiliary transmission; (5) determining the target speed of the input shaft of the continuously variable transmission, according to the selected one of the plurality of relationships; and (6) controlling a speed ratio of the continuously variable transmission so that an actual speed of the input shaft coincides with the determined target speed.

In the above method of the invention, when the selector device is set in the engine brake position, the appropriate one of the plurality of relationships is selected depending upon the forward drive position in which the auxiliary transmission is currently placed. The target speed of the input shaft of the continuously variable transmission is determined according to the selected relationship. If the auxiliary transmission in the engine brake mode is placed in a forward high-range position, for example, the target speed is determined based at least on the currently required output of the engine, according to the corresponding relationship which is different from the relationship to be selected when the auxiliary transmission is placed in a forward low-range position.

Thus, the different relationships are used for the individual forward drive positions of the auxiliary transmission which are established while the selector device is in the engine brake position. Accordingly, it is possible to use relatively lower target speeds when the relatively high output of the engine is required while the auxiliary transmission is placed in one of the forward drive positions, than the target speeds which are used while the auxiliary transmission is placed in another forward drive position of a lower speed range. In this arrangement, the relatively higher target speeds may be used after the auxiliary transmission is shifted down in the engine brake mode. In other words, the maximum vehicle speed at which a shift-down operation of the auxiliary transmission is permitted can be increased. Therefore, the shift-down operation in the engine brake mode can take place while the vehicle is running a a relatively high speed. This means an improved engine brake effect, and an increased drive force, resulting in enhanced drivability of the vehicle.

According to one advantageous feature of the above method of the invention, the above-indicated at least two forward drive positions of the auxiliary transmission includes a low-range position and a high-range position, the step of preparing a plurality of relationships comprising preparing a low-range relationship and a high-range relationship which correspond to the low-range and high-range positions, respectively. The high-range relationship is adapted to determine the target speed to be lower than that determined according to the low-range relationship, while the currently required output of the engine is in a relatively high range.

The fourth object of the invention may be attained according to a further aspect of the invention, which provides an apparatus for controlling a power transmitting system for an automotive vehicle, including a continuously variable transmission having an input shaft operatively connected to an engine of the vehicle, and further including an auxiliary transmission which is connected to the continuously variable transmission and which is automatically shifted from one of at least two forward drive positions thereof to the other, the apparatus comprising: (1) a drivability selector for selecting one of a plurality of drivability modes of the vehicle; (2) memory means for storing a plurality of shift pattern data sets each of which represents a relationship of at least two variables such as a running speed of the vehicle and a currently required output of the engine, the plurality of shift pattern data sets corresponding to the plurality of drivability modes of the vehicle; (3) means for selecting one of the plurality of shift pattern data sets which corresponds to the drivability mode selected by the drivability selector; and (4) control means for shifting the auxiliary transmission from one of the at least two forward drive positions to the other, according to the selected shift pattern data set.

In the apparatus described above, the auxiliary transmission is automatically shifted from one of its forward drive positions to the other, according to the relationship represented by the appropriate set of shift pattern data which corresponds to the currently selected drivability mode of the vehicle. Since the drivability selector is operable even while the shift lever is in a high-speed drive (normal cruise) position, the vehicle drive feels comforable with the shift-down and shift-up operations of the auxiliary transmission according to the shift-down and shift-up patterns adapted to meet the drivability mode, e.g., high power drive mode or economy drive mode, selected as needed by the operator. This feature of the invention is particularly desired when the vehicle is equipped with a high-performance engine.

BRIEF DESCRIPTION OF THE DRAWINGS

The above and optional objects, features and advantages of the present invention will become apparent by reading the following detailed description of preferred embodiments of the invention, when considered in connection with the accompanying drawings, in which:

FIG. 2 is a view showing a relation between shift positions and operating states of an auxiliary transmission of the power transmitting system of FIG. 1;

DETAILED DESCRIPTION OF THE PREFERRED EMBODIMENTS

Referring to the accompanying drawings, the preferred embodiments of the invention will now be described in detail.

Figure 1:
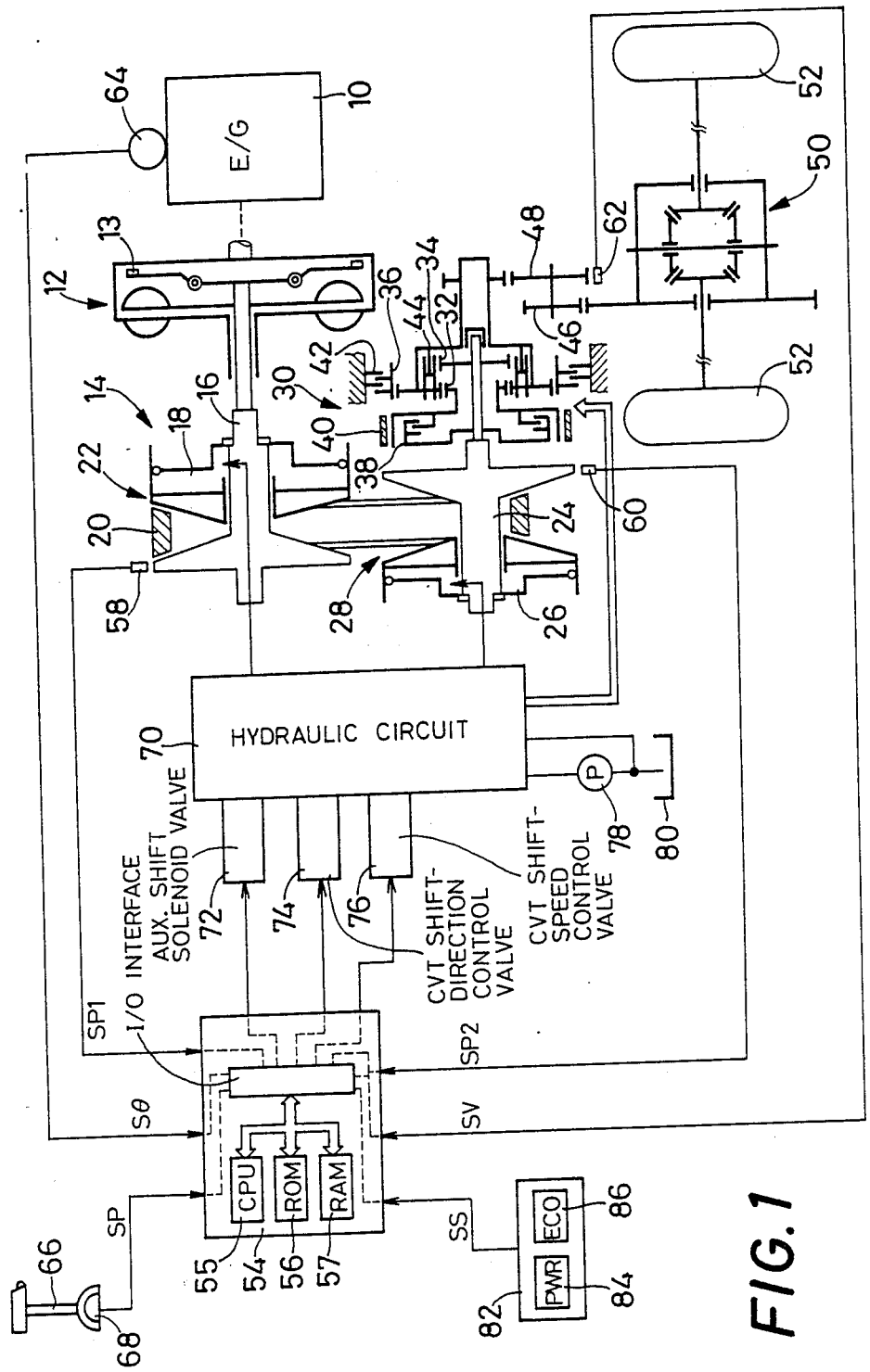
FIG. 1 is a schematic illustration of a power transmitting system of a motor vehicle, to which the prinicple of the present invention is applicable.

There is shown in FIG. 1 a hydraulically-operated power transmitting system for a motor vehicle having an engine 10. The engine 10 is connected to an input shaft 16 of a continuously variable transmission 14 (hereinafter referred to as "CVT"), via a fluid coupling 12 which is provided with a lock-up clutch 13. The CVT 14 has a variable-diameter input pulley 22 disposed on the input shaft 16. The input pulley 22 is operated by a hydraulic cylinder 18, such that the width of the V-groove is adjustable to change the effective diameter of the input pulley 22 which engages a transmission belt 20. The input pulley 22 is connected via the belt 20 to a variable-diameter output pulley 28 whose V-groove width is changed by a hydraulic cylinder 26. In this arrangement, an output torque of the engine 10 imparted to the input shaft 16 of the CVT 14 is transmitted to an output shaft 24 of the CVT 14 via the transmission belt 20 engaging the input and output pulleys 22, 28. The torque is then transmitted to an auxiliary transmission 30 via the output shaft 24 of the CVT 14. The auxiliary transmission 30 includes a complex planetary gear set of RAVIGNEAUX type, which has a first sun gear 32, a second sun gear 34 and a ring gear 36. The forward low-range and high-range positions and reverse position of the auxiliary transmission 30 with different speed ratios Rf are established through selective activation of high-range clutch 38, a low-range brake band 40, and a reverse brake band 42, as indicated in a table of FIG. 2.

Values p1 and p2 in the table of FIG. 2 are obtained from the following equations:

$$P1 = Zs1/Zr$$

$$P2 = Zs2/Zr$$

where,
Zs1: number of teeth of the first sun gear 32,
Zs2: number of teeth of the second gear 34,
Zs2: number of teeth of the ring gear 64.

The output shaft 24 of the CVT 14 functions as an input shaft of the auxiliary transmission 30, and a planet carrier 44 supporting planetary gears within the auxiliary transmission 30 serves as an output shaft of the transmission 30. Therefore, the speed ratio Rf of the auxiliary transmission 30 is a rotating speed of the shaft 24 (input shaft) divided by a rotating speed of the carrier 44 (output shaft). The torque transmitted to the carrier 44 is transmitted to a pair of drive wheels 52 of the vehicle, via intermediate gears 46, 48 and a final reduction gear unit 50.

Adjacent to the variable-diameter input and ouptut pulleys 22, 28 are disposed input and output speed sensors 58, 60, respectively, which generate pulse signals SP1, SP2 whose frequencies correspond to the rotating speeds of the input and output pulleys 22, 28, respectively. These pulse signals SP1, SP2 are applied to a controller 54. Adjacent to the intermediate gear 48 is disposed a vehicle speed sensor 62 which generates a pulse signal SV whose frequency corresponds to the rotating speed of the gear 48. The pulse signal SV is applied to the controller 54. A throttle sensor 64 is provided near a throttle valve (not shown) disposed in an intake manifold (not shown) connected to the engine 10. The throttle sensor 64 generates a throttle signal S$\theta$ indicative of an opening angle $\theta$ of the throttle valve, which is also applied to the controller 54. The vehicle is equipped with a manually operated shift lever 66 which serves as a selector device for selecting a desired operating mode of the auxiliary transmission 30. The operating of the shift lever 66 is sensed by a position sensor 68. The position sensor 68 is adapted to generate a signal SP indicative of the selected operating position Psh of the shift lever 66. The signal SP is also fed to the controller 54.

The shift lever 66 is mechanically associated with a shift valve provided within a hydraulic circuit 70. With the shift lever 66 placed in its neutral (N) position, the shift valve prevents the supply of a pressurized fluid to any hydraulic actuators for operating the high-range clutch 38, low-range brake band 40 and reverse brake band 42. With the shift lever 66 set in the REVERSE (R) position, the shift valve is operated to supply the pressurized fluid only to the actuator for operating the reverse brake band 42. The shift lever 66 has three forward drive positions, that is, ENGINE BRAKE (L) position, AUTO-SHIFT (S) position, and HIGH-SPEED DRIVE (D) position. When the shift lever 66 is set in the ENGINE BRAKE position, the auxiliary transmission 30 is always placed in its low-range position, with the shift valve operated to supply the fluid only to the actuator for operating the low-range brake band 40. When the shift lever 66 is set in the AUTO-SHIFT (S) position, the auxiliary transmission 30 is placed in either the low-range position or the high-range position, with the shift valve operated to supply the fluid to the respective one of the low-range brake band 40 and the high-range clutch 38, depending upon the operation position of an AUX. SHIFT solenoid valve 72 provided in the hydraulic circuit 70. With the shift lever 66 placed in its HIGH-SPEED DRIVE position, the auxiliary transmission 30 is always placed in the high-range position, with the shift valve operated to supply the pressurized fluid only to the actuator for operating the high-range clutch 38.

The vehicle is provided with a DRIVABILITY selector switch 82 which includes an ECON. pushbutton 84 and a PWR pushbutton 86. The switch 82 generates a signal SS indicating one of the pushbuttons 84, 96 which has been depressed. The ECON. pushbutton 84 is operated when it is desired to run the vehicle with relatively high fuel economy. The signal SS is also fed to the controller 54. When it is desired to drive the vehicle with relatively high power (with comparatively high drivability), the PWR pushbutton 86 is depressed.

The hydraulic circuit 70 indicated above is adapted to supply the hydraulic cylinder 26 associated with the output shaft 24 of the CVT 14, with a line pressure which is adjusted based on the actual speed ratio of the CVT 14 and the actual output torque of the engine 10. The hydraulic cylinder 26 is operated primarily for maintaining the tension of the transmission belt 20 at a required minimum level. Further, the hydraulic circuit 70 is adapted to supply or discharge the fluid to or from the hydraulic cylinder 18 associated with the input shaft 16 of the CVT 14, depending upon the operating position of a CVT shift-direction control valve 74. The rate of flow of the fluid to or from the hydraulic cylinder 18 is regulated by a CVT shift-speed control valve 76. The hydraulic circuit 70 is connected to a hydraulic pressure source in the form of a hydraulic pump 78 which is operated by a suitable drive means such as the engine 10, to pressurize the fluid in an oil reservoir 80 and feed the pressurized fluid to the hydraulic circuit 70.

The controller 54 consists of a microcomputer which includes a central processing unit (CPU) 55, a read-only memory (ROM) 56, and a random-access memory (RAM) 57. The CPU 55 is operated to process received input signals, according to programs stored in the ROM 56, while utilizing a temporary data storage function of the RAM 57, in order to control the AUX. SHIFT solenoid valve 72 for automatic shifting operations of the auxiliary transmission 30, and the CVT shift-direction and shift-speed control valves 74, 76 for controlling the CVT 14 so as to establish an optimum speed ratio. In the present embodiment, the ROM 56 serves as memory means which stores various data representing the relationships shown in FIG. 4 through FIG. 7, which will be described.

Referring to the flow chart of FIG. 3, the operation of the controller 54 according to the present invention to control the power transmitting system will now be described.

Figure 3:
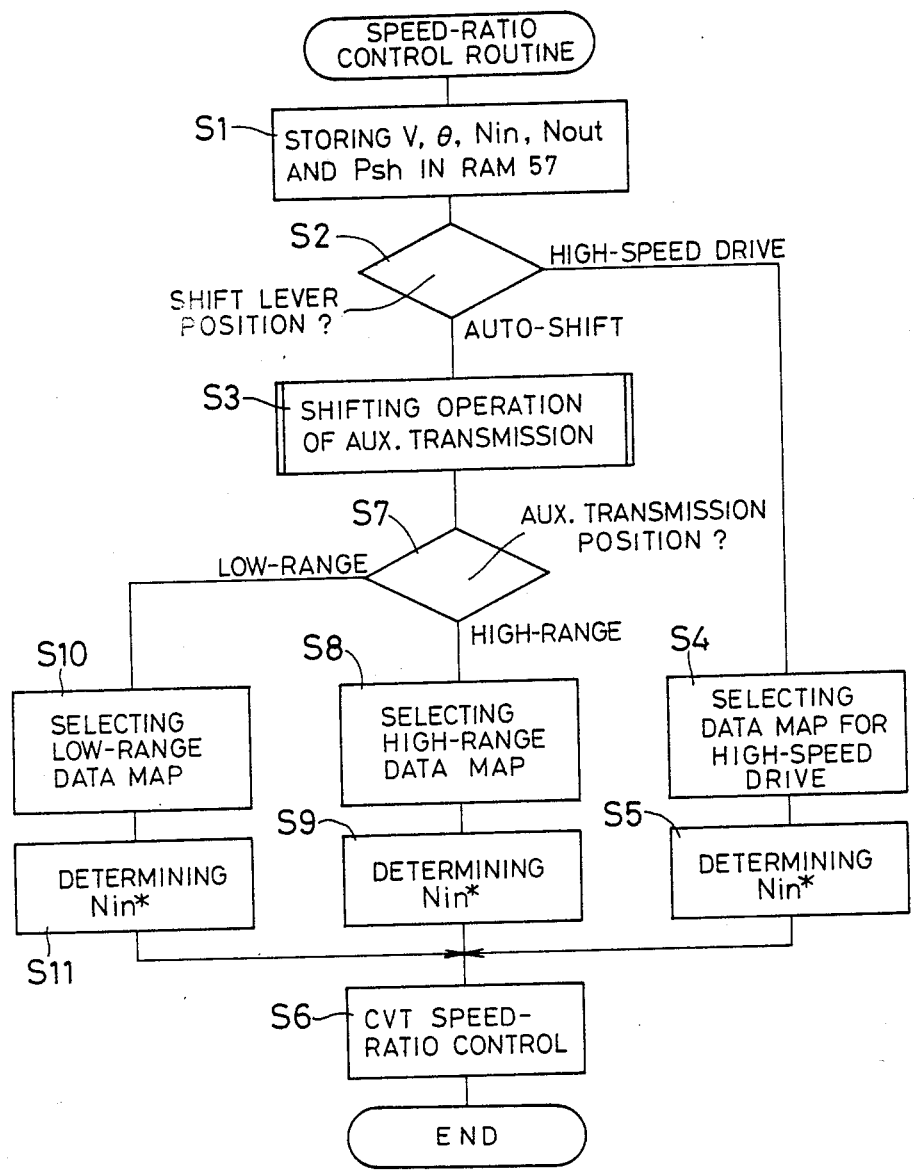
FIG. 3 is a flow chart illustrating a routine for controlling the speed ratio of the power transmitting system of FIG. 1, according to one embodiment of the present invention.

The flow chart of FIG. 3 shows a routine for controlling the overall speed ratio of the power transmitting system of the vehicle, that is, the speed ratio of the CVT 14 and the speed ratio of the auxiliary transmission 30. Initially, the CPU 55 executes step S1 to store in the RAM 57 data representative of the current vehicle speed V, throttle opening angle $\theta$, speed Nin of the input shaft 16, speed Nout of the output shaft 24 and selected position Psh of the shift lever 66, based on the signals SP1, SP2, S$\theta$, SV and SP. Step S1 is followed by step S2 to check if the shift lever 66 is currently placed in the HIGH-SPEED DRIVE position or the AUTO-SHIFT position. If the shift lever 66 is found to be in the HIGH-SPEED DRIVE position, the CPU 55 goes to step S4 to select a data map for the HIGH-SPEED DRIVE position, from among a plurality of data maps stored in the ROM 56. This HIGH-SPEED DRIVE data map is prepared to determine a target speed Nin* of the input shaft 16 suitable for running the vehicle at a comparatively high speed. For example, the HIGH-SPEED DRIVE data map represents a relationship of FIG. 5 among the target speed Nin*, throttle opening angle $\theta$ and vehicle speed V. This relationship is adapted to determine the target speed Nin* based on the current throttle opening angle $\theta$ and the current vehicle speed V, so as to assure maximum combustion efficiency of the engine 10 and maximum drivability of the vehicle at a comparatively high speed. After the target speed Nin* of the input shaft 16 has been determined in step S5, the CPU 55 goes to step S6 to control the CVT shift-direction and shift-speed control valves 74, 76 for changing the speed ratio of the CVT 14 so that the actual speed Nin of the input shaft 16 coincides with the determined target speed Nin*.

Figure 4:
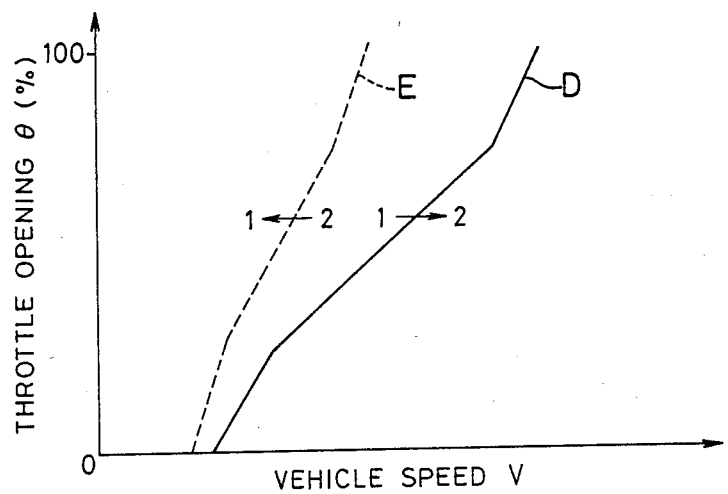
FIG. 4 is a view showing shift-up and shift-down patterns used in the control routine of FIG. 3, for automatic shifting operations of the auxiliary transmission.

If the checking in step S2 reveals that the shift lever 66 is placed in the AUTO-SHIFT position, step S2 is followed by step S3 in which the auxiliary transmission 30 is automatically shifted from its low-range position to its high-range position or vice verse, as required. Described more specifically, the low-range position or high-range position is selected based on the vehicle speed V and the throttle opening angle $\theta$, according to shift-up and shift-down patterns as shown in FIG. 4, for example, which are stored as a data map in the ROM 56. In the figure, character D represents a shift-up boundary line used for judging whether the transmission 30 should be shifted up from its low-range position (1) to its high-range position (2). This shift-up boundary line D is determined with the vehicle's drive characteristics taken into account. Character E in the figure represents a shift-down boundary line used for judging whether the transmission 30 should be shifted down from the high-range position (2) to the low-range position (1). This shift-down boundary line E is determined so as to provide a suitable hysteresis, and with the kick-down acceleration characteristics of the vehicle taken into account.

Figure 6:
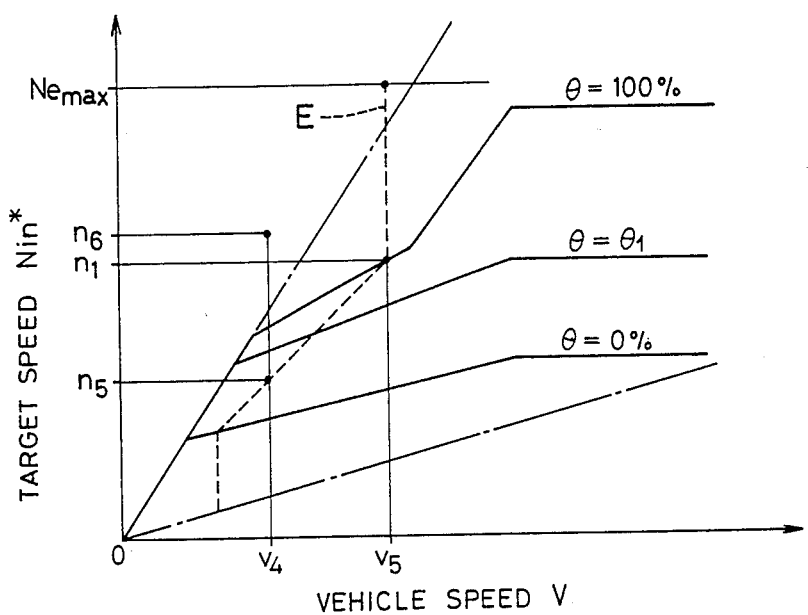

Subsequently, the CPU 55 goes to step S7 to check if the auxiliary transmission 30 is placed in the low-range position or high-range position. If the high-range position is currently selected, step S7 is followed by step S8 to select a HIGH-RANGE data map representative of a relationship as shown in FIG. 6, for example, which is used for determining the target speed Nin* for the input shaft 16. In the next step S9, the target speed Nin* suitable for the high-range position of the auxiliary transmission 30 is determined based on the throttle opening angle $\theta$ and the vehicle speed V, according to the selected HIGH-RANGE data map. Step S9 is followed by step S6 in which the speed ratio of the CVT 14 is controlled so that the actual speed Nin of the input shaft 16 coincides with the determined target speed Nin* which has been determined according to the HIGH-RANGE data map.

Figure 7:
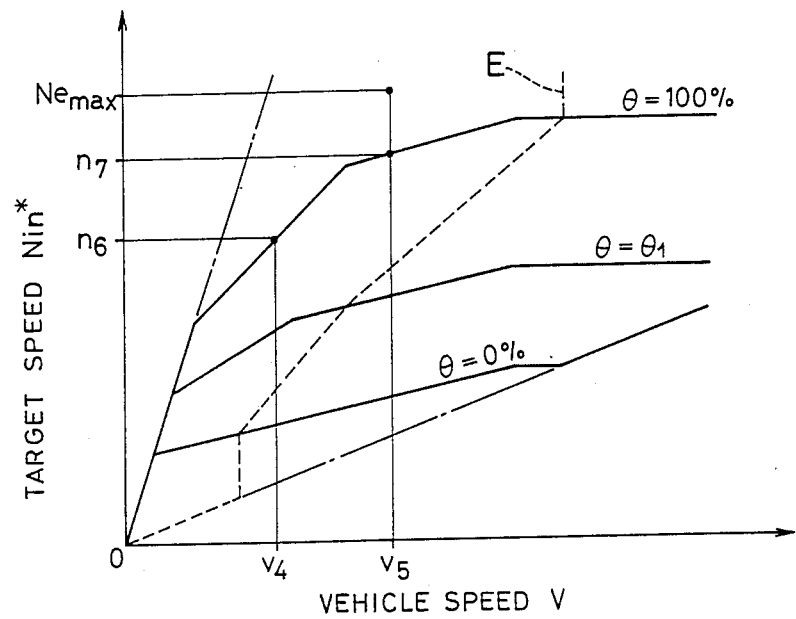

If the checking in step S7 reveals that the auxiliary transmission 30 is placed in the low-range position, the CPU 55 executes step S10 to select a LOW-RANGE data map representative of a relationship as shown in FIG. 7, for example. In the next step S11, the target speed Nin* of the input shaft 16 suitable for the low-range position of the auxiliary transmission 30 is determined according to the selected LOW-RANGE data map. Step S6 is then executed to control the speed ratio of the CVT 14 so that the actual speed Nin of the input shaft 16 coincides with the determined target speed Nin* which has been determined according to the LOW-RANGE data map.

In the present embodiment, means for executing steps S7, S8 and S10 constitute means for selecting the HIGH-RANGE and LOW-RANGE data maps, depending upon the currently selected position of the auxiliary transmission 30. Further, means for executing steps S9 and S11 constitute means for determining the target speed Nin* of the input shaft 16 according to the selected data map.

The above control routine of FIG. 3 is repeatedly executed. If the shift lever 66 is placed in the HIGH-SPEED DRIVE position, and the vehicle is running at a speed v2 with a throttle opening angle $\theta$1, the target speed Nin* is determined to be n2, in step S5, according to the relationship of FIG. 5. Consequently, the CVT 14 is controlled in step S6 so that the speed of the input shaft 16 is equal to the determined target speed Nin*. If the accelerator pedal of the vehicle is depressed to fully open the throttle valve (to obtain the full throttle opening of 100%), the target speed Nin* is changed from n2 to n3. Thereafter, the target speed Nin* increases up to the level of N4 as the vehicle speed V increases.

If the accelerator pedal is depressed to its full throttle position ($\theta$=100%) while the auxiliary transmission 30 is placed in the HIGH-RANGE position with the shift lever 66 in the AUTO-SHIFT position, the auxiliary transmission 30 is automatically shifted down. Stated in more detail, if the throttle valve is operated from a position near the 0% level to the fully open position (100%) while the vehicle speed V is at v4, as indicated in FIG. 6, the throttle opening $\theta$ crosses the shift-down boundary line E of FIG. 4 when the target speed Nin* reaches n5. Therefore, the auxiliary transmission 30 is shifted down from its high-range position to its low-range position. Immediately after the shift-down of the auxiliary transmission 30, the actual speed Nin of the input shaft 16 is increased from n5 to n6 which a product of n5 and a ratio of the speed ratio r of the auxiliary transmission 30 in the low-range position to that in the high-range position, i.e., $n6=n5\times r$. Subsequently, the speed ratio of the CVT 14 is controlled so that the actual speed Nin coincides with the target speed Nin*. The actual speed Nin of the input shaft 16 immediately after the shift-down of the auxiliary transmission 30 should not exceed a maximum permissible speed $Ne_{max}$ of the engine 10. To avoid the actual speed Nin of the input shaft 16 exceeding the maximum permissible speed $Ne_{max}$ of the engine 10, the data map of FIG. 6 is so prepared that the maximum permissible target speed n1 of the input shaft 16 at 100% throttle opening corresponds to a relatively high vehicle speed v5. Namely, the Nin*-V curve at the 100% throttle opening in FIG. 6 is bent downward in the figure to use comparatively lower target speeds Nin* for the same vehicle speed V, as compared with the corresponding curve of FIG. 5. Therefore, the auxiliary transmission 30 can be shifted down without a subsequent excessive increase of the speed of the input shaft 16, even when the vehicle speed V is at a relatively high level, e.g., at v5 with the 100% throttle opening. Thus, the drivability of the vehicle is not deteriorated.

After the auxiliary transmission 30 has been shifted down, the speed ratio of the CVT 14 is controlled so as to eliminate a difference between the actual speed Nin of the input shaft 16 (which is increased immediately after the shift-down operation), and the target speed Nin* which is determined based on the vehicle speed V and the throttle opening angle $\theta$, according to the LOW-RANGE data map of FIG. 7. As indicated in the figure, the LOW-RANGE data map is so prepared that the Nin*-V curve at the 100% throttle opening is bent upward in the figure to use comparatively higher target speeds Nin* for the same vehicle speed V, as compared with the corresponding curve of the HIGH-RANGE data map of FIG. 6. Therefore, the difference between the actual speed Nin and the target speed Nin* immediately after the shift-down action of the auxiliary transmission 30 will be reduced at a relatively high rate. According to a conventionally used low-range data map shown in FIG. 9, for example, a difference between Nin and Nin* at a vehicle speed v1 immediately after a shift-down operation is $(Ne_{max}-n8)$ when the throttle opening is 100%. This difference $(Ne_{max}-n8)$ is compared with a comparatively smaller difference $(Ne_{max}-n7)$ at a comparatively higher vehicle speed v5, according to the LOW-RANGE data map of FIG. 7 used in the present embodiment. This smaller difference between Nin $(Ne^{max})$ and Nin* immediately after a shift-down operation of the auxiliary transmission 30 according to the LOW-RANGE data map of FIG. 7, indicates an accordingly smaller variation in the speed ratio of the CVT 14 in a direction to accommodate the difference. Hence, an unfavorable feeling due to an abrupt change of the speed ratio of the CVT 14 at the time of a shift-down operation of the auxiliary transmission 30 is mitigated, and the driving comfort of the vehicle operator is accordingly enhanced.

Figure 8:
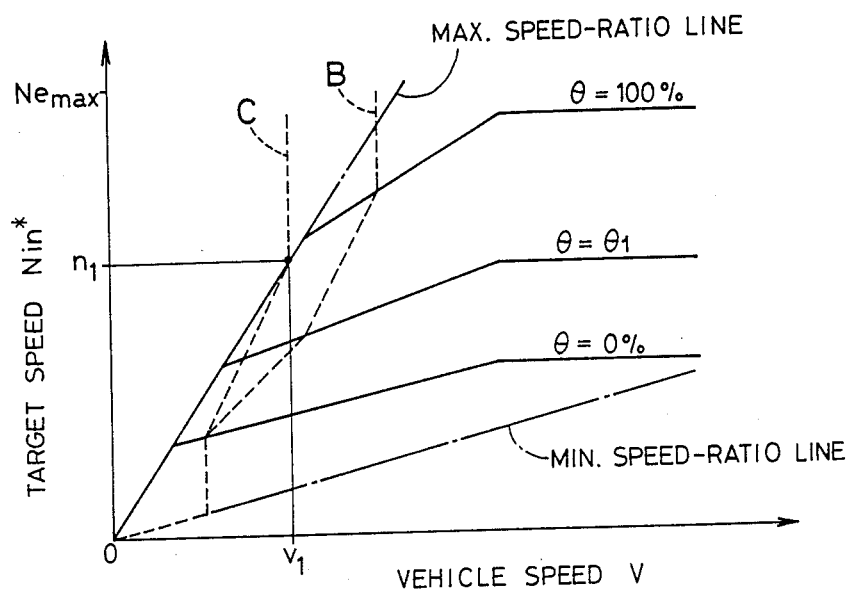
FIGS. 8 and 9 are diagrams corresponding to those of FIGS. 6 and 7, respectively, showing relationships conventionally used for determining the target speed of the engine.
Figure 9:
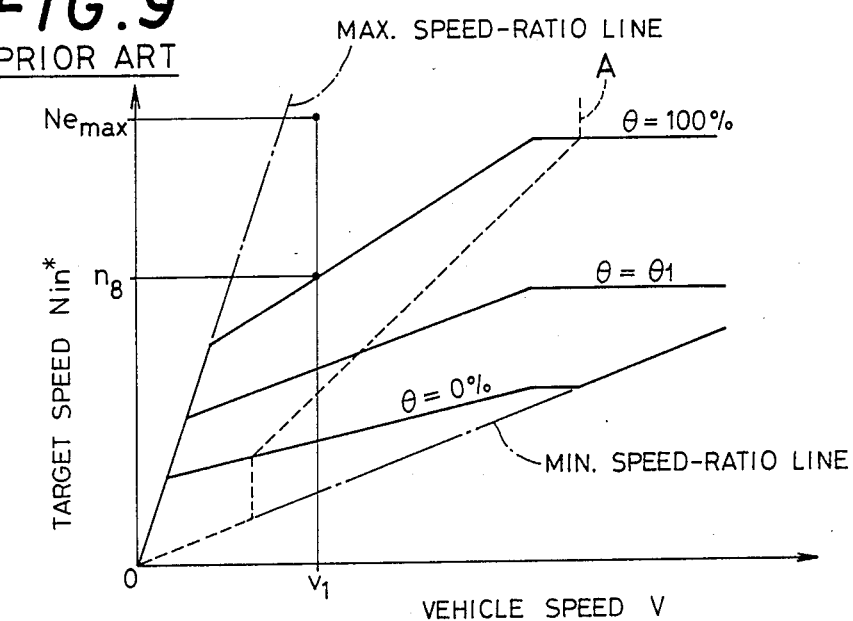
Figure 10:
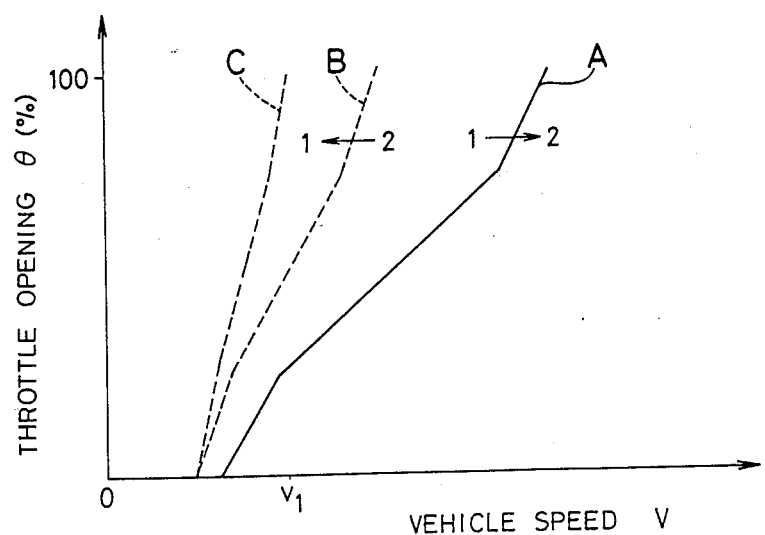
FIG. 10 is a view corresponding to that of FIG. 4, showing conventionally used shift patterns.

FIG. 8 is a diagram showing a conventionally used relation or data map for determining the target speed Nin* when the auxiliary transmission 30 is placed in the high-range position. As indicated above, FIG. 9 shows the conventional data map for determining the target speed Nin* for the low-range position of the transmission 30. Further, FIG. 10 shows conventionally used shift-up and shift-down patterns, which correspond to those of FIG. 4 according to the invention. Shift-up and shift-down boundary lines A and B of FIG. 10 are also indicated in FIG. 9 and FIG. 8, respectively. As described above, the actual engine speed immediately after a shift-down operation of the auxiliary transmission 30 should not exceed the maximum permissible speed $Ne_{max}$. Therefore, the engine speed immediately before the shift-down operation must be kept at a sufficiently low level. To this end, a shift-down boundary line C which is shifted to the left of the line B (to the side of lower vehicle speeds V) must be actually used, whereby the auxiliary transmission 30 is shifted down after the vehicle speed V is reduced to a comparatively lower level, e.g., to the level of v1 when the throttle opening is 100%, as indicated in FIG. 8. Thus, the conventional method inevitably suffers from undesirable reduction in the vehicle drivability due to a shift-down operation of the transmission 30 at a relatively low vehicle speed.

Figure 5:
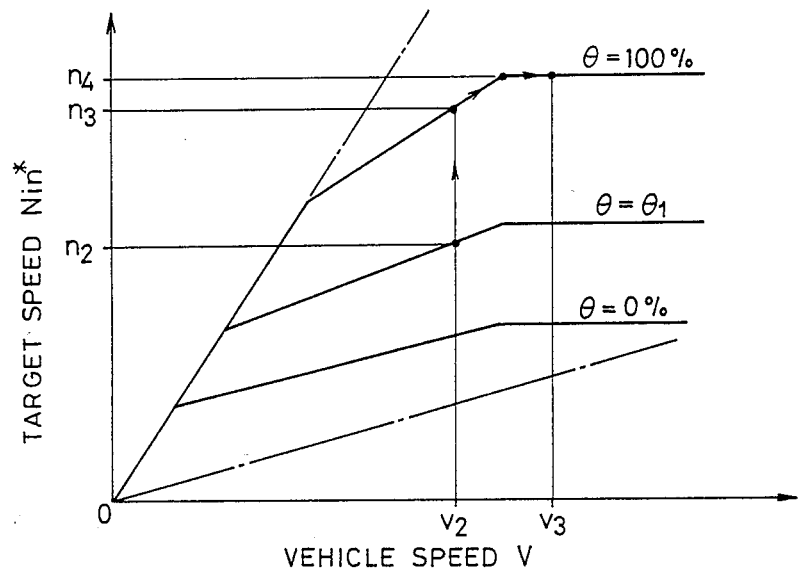
FIGS. 5, 6 and 7 are diagrams showing relationships used in the control routine of FIG. 3, for determining a target speed of an engine of the vehicle.

Another feature of the present embodiment is the selective use of two different data maps for the HIGH-RANGE position of the auxiliary transmission 30, that is, the HIGH-SPEED DRIVE data map of FIG. 5 used when the high-range position is selected while the shift lever 66 is in the HIGH-SPEED DRIVE position, and the HIGH-RANGE data map of FIG. 6 used when the high-range position is selected with the shift lever 66 in the AUTO-SHIFT position. The HIGH-SPEED DRIVE data map of FIG. 5 represents a relationship among the throttle opening $\theta$, vehicle speed V and target speed Nin*, which relationship is predetermined for determining the target speed Nin* so as to provide maximum fuel economy and vehicle drivability. On the other hand, the relationship represented by the HIGH-RANGE data map of FIG. 6 is predetermined so as to eliminate or minimize the conventionally experienced inconveniences immediately after a shift-down operation of the transmission 30, as well as to assure maximum fuel economy and vehicle drivability. While the power transmitting system is operating with the shift lever 66 in the HIGH-SPEED DRIVE position, the auxiliary transmission 30 is rarely shifted down to the low-range position. Therefore, the use of the data map of FIG. 5 which is not adapted to deal with the shift-down inconveniences, will further improve the drivability of the vehicle in the HIGH-SPEED DRIVE mode.

As described above, the illustrated embodiment is adapted to the vehicle which is operable selectively in the HIGH-SPEED DRIVE mode wherein the auxiliary transmission 30 is always placed in the high-range position, or in the AUTO-SHIFT mode wherein the auxiliary transmission 30 is automatically shifted between the two formed drive positions depending upon the varying driving conditions. However, the concept of the illustrated embodiment may be practiced where the vehicle is always operated in the AUTO-SHIFT mode, or where the DRIVABILITY selector switch 82 is not provided.

A second embodiment of the present invention will be described. This modified embodiment has substantially the same physical arrangement as shown in FIG. 1, but does not use the DRIVABILITY selector switch 82. For easy understanding, the same reference numerals as used in the first embodiment will be used in the following description, to identify the corresponding mechanical components. Repeated description of these components will not be provided, in the interest of brevity and simplification.

Figure 11:
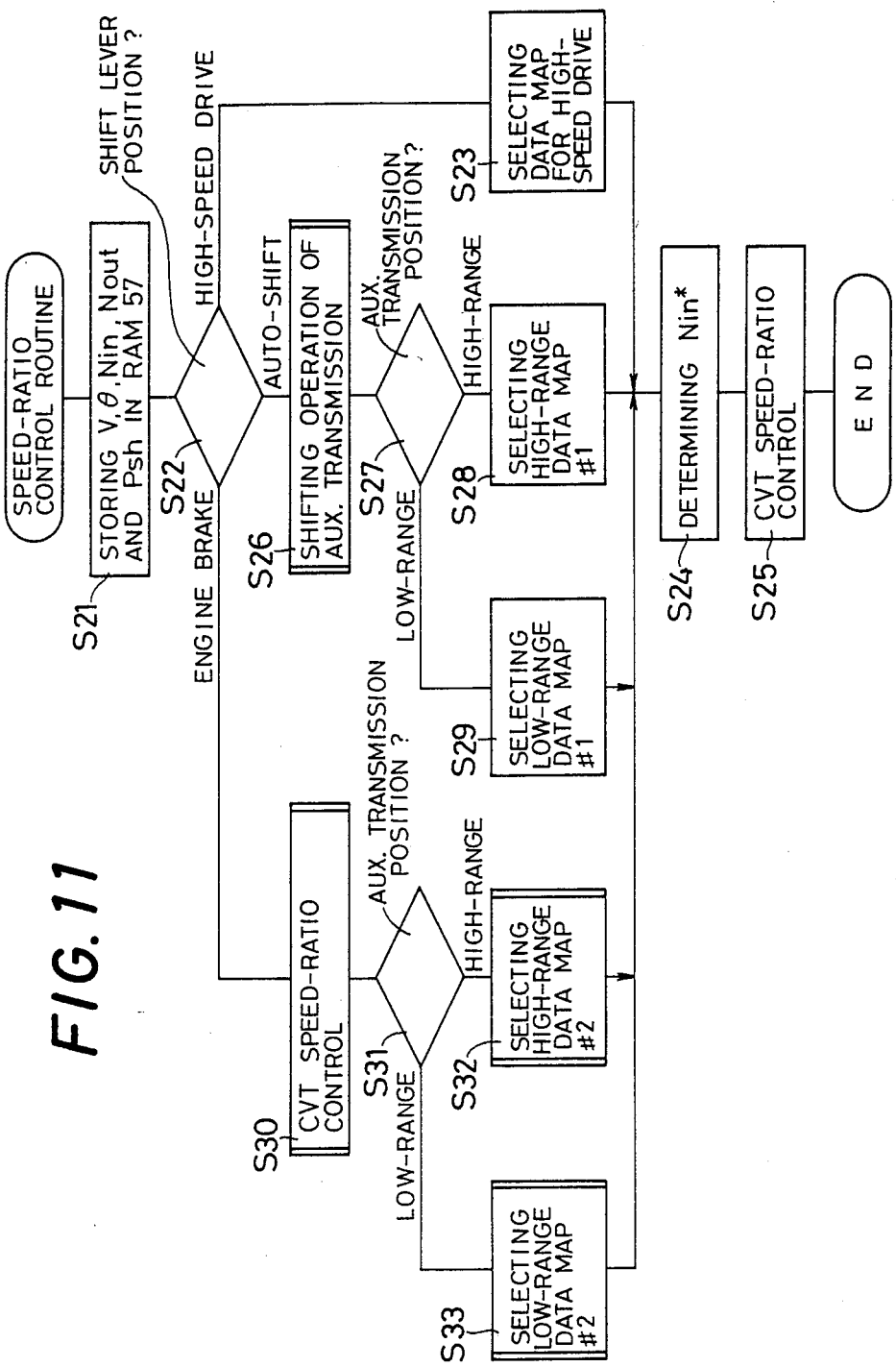
FIG. 11 is a flow chart showing a speed-ratio control routine according to another embodiment of the invention.

The flow chart of FIG. 11 shows a routine for controlling the power transmitting system according to the present embodiment, i.e., for controlling the overall speed ratio of the CVT 14 and the auxiliary transmission 30. Initially, the CPU 55 executes step S21 to store in the RAM 57 data representative of the current vehicle speed V, throttle opening angle $\theta$, speed Nin of the input shaft 16, speed Nout of the output shaft 24 and selected position Psh of the shift lever 66, based on the signals SP1, SP2, S$\theta$, SV and SP. Step S21 is followed by step S22 to detect currently selected one of the three positions of the shift lever 66, HIGH-SPEED DRIVE position, AUTO-SHIFT position or ENGINE BRAKE position. If the shift lever 66 is found to be in the HIGH-SPEED DRIVE position, the CPU 55 goes to step S23 to select a data map for the HIGH-SPEED DRIVE position, from among a plurality of data maps stored in the ROM 56. When the shift lever 66 is placed in the HIGH-SPEED DRIVE position, the shift valve incorporated in the hydraulic circuit 70 is normally operated to supply the pressurized fluid only to the actuator for operating the high-speed clutch 38 of the auxiliary transmission 30, thereby holding the auxiliary transmission 30 in the high-range position. This HIGH-SPEED DRIVE data map is prepared to determine a target speed Nin* of the input shaft 16 suitable for running the vehicle at a relatively high speed in the HIGH-SPEED DRIVE mode. For example, the HIGH-SPEED DRIVE data map represents a relationship of FIG. 5 among the target speed Nin*, throttle opening angle $\theta$ and vehicle speed V. This relationship is adapted to determine the target speed Nin* so as to assure maximum combustion efficiency of the engine 10 and maximum drivability of the vehicle at a comparatively high speed. Then, the CPU 55 goes to step S24 to determine the target speed Nin* based on the throttle opening angle $\theta$ and the vehicle speed V, according to the relationship of the selected HIGH-SPEED DRIVE data map. Step S24 is followed by step S25 to control the CVT shift-direction and shift-speed control valves 74, 76 for changing the speed ratio of the CVT 14 so that the actual speed Nin of the input shaft 16 coincides with the determined target speed Nin*.

If the checking in step S22 indicates that the shift lever 66 is placed in the AUTO-SHIFT position, step S22 is followed by step S26 in which the auxiliary transmission 30 is automatically shifted from its low-range position to its high-range position or vice versa, as required. Described in greater detail, the low-range position or high-range position is selected based on the vehicle speed V and the throttle opening angle $\theta$, according to shift-up and shift-down patterns as shown in FIG. 4, for example, which are stored as a data map in the ROM 56. The CPU 55 commands the AUX. SHIFT solenoid valve 72 to establish the selected low-range or high-range position of the auxiliary transmission 30.

Subsequently, the CPU 55 goes to step S27 to check if the auxuliary transmission 30 is placed in the low-range position or high-range position. If the high-range position is currently selected, step S27 is followed by step S28 to select a HIGH-RANGE data map #1 representative of relationship as shown in FIG. 6, for example, which is used for determining the target speed Nin* of the input shaft 16. If the checking in step S27 reveals that the auxuliary transmission 30 is placed in the low-range position, the CPU 55 executes step S29 to select a LOW-RANGE data map #1 representative of a relationship as shown in FIG. 7, for example. After the appropriate HIGH-RANGE or LOW-RANGE data map #1 is selected depending upon the selected position of the auxiliary transmission 30, the CPU 55 goes to step S24 to determine the target speed Nin*, according to the selected HIGH-RANGE or LOW-RANGED data map #1. In the next step S25, the speed ratio of the CVT 14 is controlled so that the actual speed Nin of the input shaft 16 coincides with the determined target speed Nin*.

As shown in FIG. 6, the HIGH-RANGE data map #1 is so prepared that the Nin*-V curve at the 100% throttle opening is bent downward in the figure to use comparatively lower target speeds Nin* for the same vehicle speed V, as compared with the corresponding curve of FIG. 5 of the HIGH-SPEED DRIVE data map. Therefore, the auxiliary transmission 30 can be shifted down, even when the vehicle speed V is at a relatively high level.

If the checking in step S22 reveals that the shift lever 66 is placed in the ENGINE BRAKE position, step S22 is followed by step S30 in which the low-range or high-range position of the auxiliary transsmision 30 is selected based on the vehicle speed V and the throttle opening angle $\theta$, according to a suitable shift pattern defined by a data map stored in the ROM 56. The selected low-range or high-range position is established by means of the AUX. SHIFT solenoid valve 72. In this step S30, only one shift pattern as represented by a dashed line F in FIG. 12. In the ENGINE BRAKE mode with the shift lever 66 in the ENGINE BRAKE position, the auxiliary transmission 30 can be shifted down from the high-range position to the low-range position, by means of the shift valve incorporated in the hydraulic circuit 70. Once the auxiliary transmission 30 is shifted down, however, the transmission 30 cannot be restored to its high-range position, as long as the shift lever 66 is held in the ENGINE BRAKE position.

Figure 12:
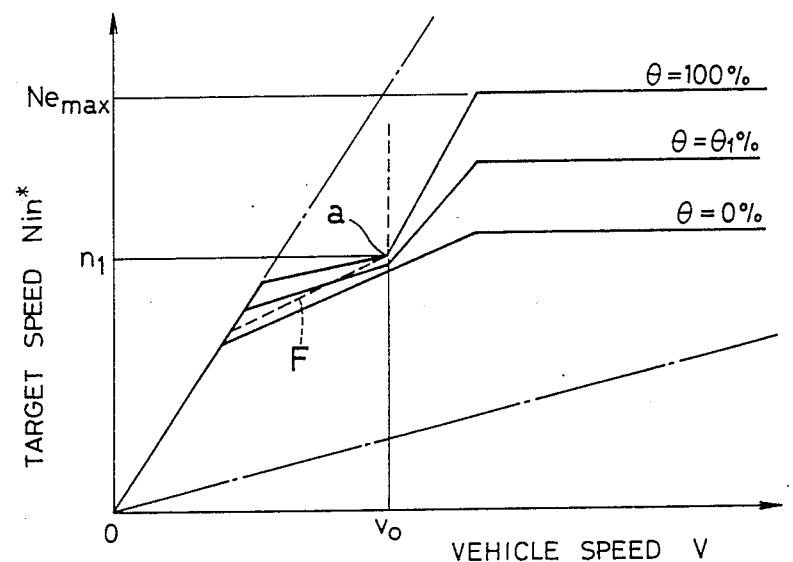
FIGS. 12 and 13 are diagrams showing relationships used in the control routine of FIG. 11 for determining the target speed of the engine.
Figure 13:
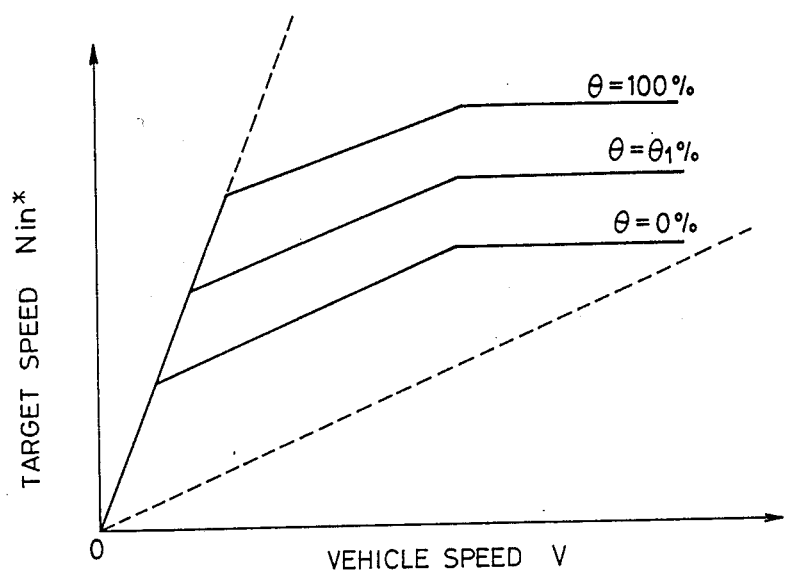

Step S30 is followed by step S31 in which the CPU 55 checks if the auxiliary transmission 30 is placed in the high-range or low-range position. If the auxiliary transmission 30 is found to be placed in the high-range position, the CPU 55 goes to step S32 to select a HIGH-RANGE data map #2 representative of a relationship as shown in FIG. 12. If the checking in step S31 reveals that the auxiliary transmission 30 is placed in the low-range position, the CPU 55 goes to step S33 to select a LOW-RANGE data map #2 representative of another relationship as shown in FIG. 13. Therefore, means for executing steps S31, S32 and S32 constitute means for selecting the appropriate one of the the HIGH-RANGE and LOW-RANGE data maps #2 for the ENGINE BRAKE mode (stored in the memory means in the form of the ROM 56), depending upon the high-range or low-range position of the auxiliary transmission 30 which is currently selected while the shift lever 66 is placed in the ENGINE BRAKE position. Further, means for executing step S24 constitutes means for determining the target speed Nin* based on the vehicle speed V and the throttle opening angle $\theta$, according to the selected data map.

After the HIGH-RANGE dat map #2 or LOW-RANGE data map #2 is selected in steps S32, S33 depending upon the currently selected position of the auxiliary transmission 30, the CPU 55 executes step S24 to determine the target speed Nin* suitable for the high-range or low-range position of the auxiliary transmission 30 in the ENGINE BRAKE mode, according to the selected HIGH-RANGE data map #2 or LOW- RANGE data map #2. In the next step S25, the speed ratio of the CVT 14 is controlled so that the actual speed Nin of the input shaft 16 coincides with the determined target speed Nin*.

The HIGH-RANGE data map #2 of FIG. 12 and the LOW-RANGE data map #2 of FIG. 13 which are used in the ENGINE BRAKE mode are prepared so as to use the relatively higher target speeds Nin*, than the target speeds Nin* which are determined by the previously indicated HIGH-RANGE dat map #1 of FIG. 6 and LOW-RANGE data map #1 of FIG. 7 selected in steps S28 and S29, respectively. Accordingly, an increased engine brake effect is provided or an increased drive force is obtained, in the ENGINE BRAKE mode than in the AUTO-SHIFT mode. The relationship represented by the HIGH-RANGE data map #2 and the relationship represented by the LOW-RANGE data map #2 are basically similar to each other. However, the relationship of the HIGH-RANGE data map #2 is determined so as to use the relatively lower target speeds Nin* for the relatively large throttle opening angles, than the target speeds determined according to the LOW-RANGE data map #2.

The above control routine of FIG. 11 is repeatedly executed while the vehicle is running. If the shift lever 66 is moved from the AUTO-SHIFT or HIGH-SPEED DRIVE position to the ENGINE BRAKE position while the auxiliary transmission 30 is placed in its high-range position, the HIGH-RANGE data map #2 of FIG. 12 is selected, and vehicle is run for a short time with the auxiliary transmission 30 kept in the high-range position. In this running condition, the target speed Nin* of the input shaft 16 of the CVT 14 is determined acording to the HIGH-RANGE data map #2, and the speed ratio of the CVT 14 is controlled so that the actual speed Nin of the input shaft 16 coincides with the determined target speed Nin*. Assuming that the throttle opening angle $\theta$ is kept at $\theta 1$ and the vehicle speed V is gradually lowered, the auxiliary transmission 30 is shifted down when the Nin*-V curve at the throtle opening angle $\theta 1$ crosses the shift-down boundary line F (dashed line) indicated in FIG. 12. Thereafter, the auxiliary transmission 30 is held in the low-range position.

As indicated in FIG. 12, the Nin*-V curve at the 100% throttle opening crosses the shift-down boundary line F at an intersection point "a". This point "a" corresponds to the maximum vehicle speed v0 at which the auxiliary transmission 30 can be shifted down without a rise of the speed of the input shaft 16 beyond the maximum permissible speed $Ne_{max}$ of the engine 10. Namely, the maximum vehicle speed v0 corresponds to the maximum speed of the input shaft 16 (or the engine 10) immediately before a shift-down operation of the auxiliary transmission 30 should be lower than an upper limit n1 ($=Ne_{max}$ divided by the speed ratio r of the auxiliary transmission 30 in the low-range position, where the speed ratio of the same in the high-range position is equal to 1). In this embodiment, the maximum vehicle speed v0 which permits the auxiliary transmission 30 to be shifted down is made relatively higher, since the HIGH-RANGE data map #2 of FIG. 12 is prepared so that relatively low target speeds Nin* are used for the vehicle speeds near v0 when the throttle opening angle is relatively large.

According to the present embodiment, if the shift lever 66 is set to its ENGINE BRAKE position while the auxiliary transmission 30 is placed in the high-range position, the auxiliary transmission 30 can be shifted down at a relatively high vehicle speed, whereby the vehicle speed can be lowered with an effective engine brake applied, or the vehicle can be driven with a high drive force. Thus, the drivability of the vehicle is considerably improved.

Figure 14:
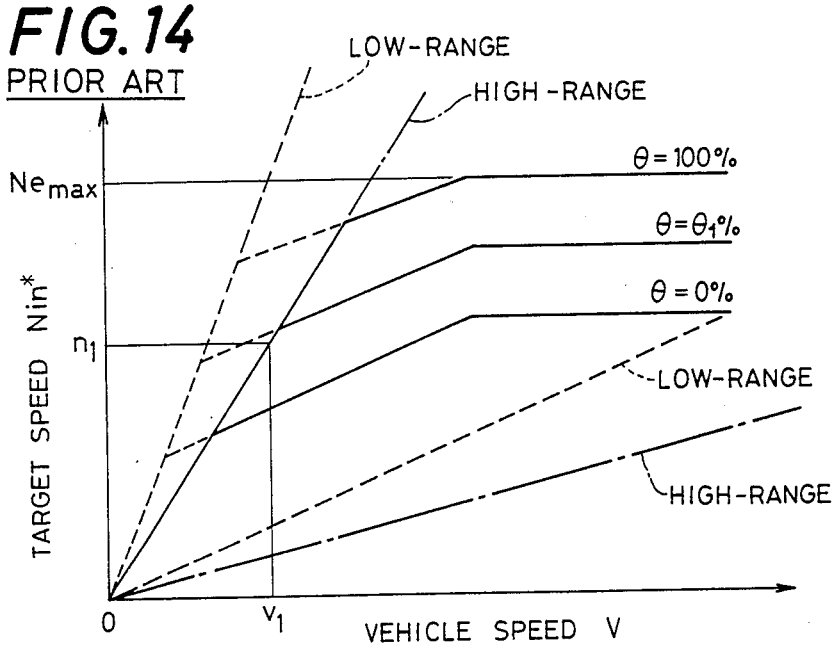
FIG. 14 is a diagram corresponding to that of FIG. 12, showing a relationship conventionally used to determine the target engine speed.

FIG. 14 shows a conventionally used relationship (data map) similar to the relationship of FIG. 13 (LOW-RANGE data map #2). This conventional relationship is used for the high-range position of the auxiliary transmission, as well as for the low-range position. That is, different portions of the relationship are used depending upon the selected position of the auxiliary transmission while in the ENGINE BRAKE mode. According to this conventional relationship, the maximum shift-down vehicle speed v1 corresponding to the engine speed n1 immediately before a shift-down action of the auxiliary transmission is considerably lower than the corresponding maximum shift-down vehicle speed vo (FIG. 12) according the present embodiment.

A third embodiment of the invention will be described. This embodiment employs substantially the same physical arrangement as shown in FIG. 1, but the shift lever 66 does not have the AUTO-SHIFT position.

Figure 15:
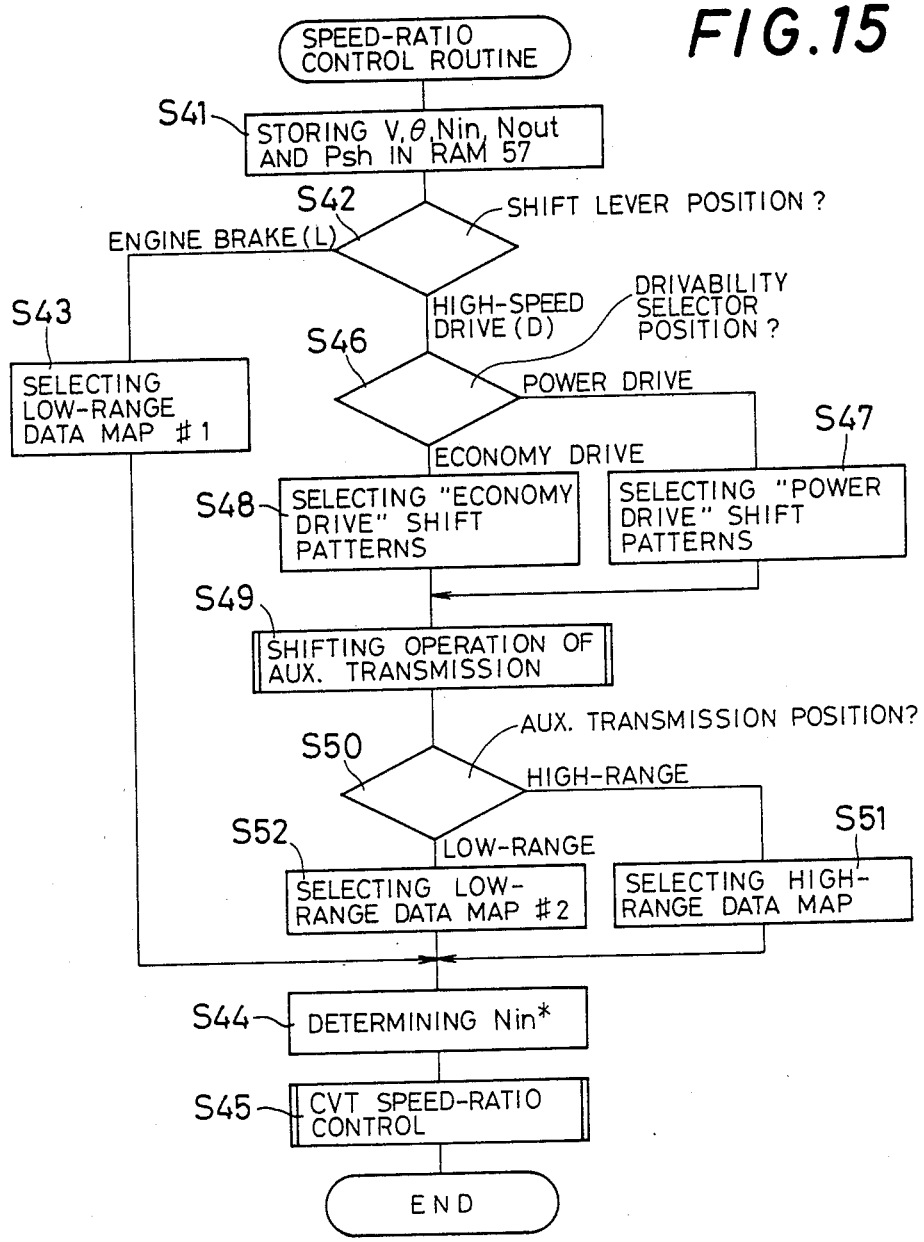
FIG. 15 is a flow chart showing a speed-ratio control routine according to a further embodiment of the invention.

Referring to FIG. 15, the operation of this third embodiment will be described. Initially, step S41 is executed to store in the RAM 57 data representative of the current vehicle speed V, throttle opening angle $\theta$, speed Nin of the input shaft 16, speed Nout of the output shaft 24 and selected position Psh of the shift lever 66, based on the signals SP1, SP2, S$\theta$, SV and SP. Step S41 is followed by step S42 to check if the shift lever 66 is currently placed in the HIGH-SPEED DRIVE (D) position or the ENGINE BRAKE (L) position.

Figure 17:
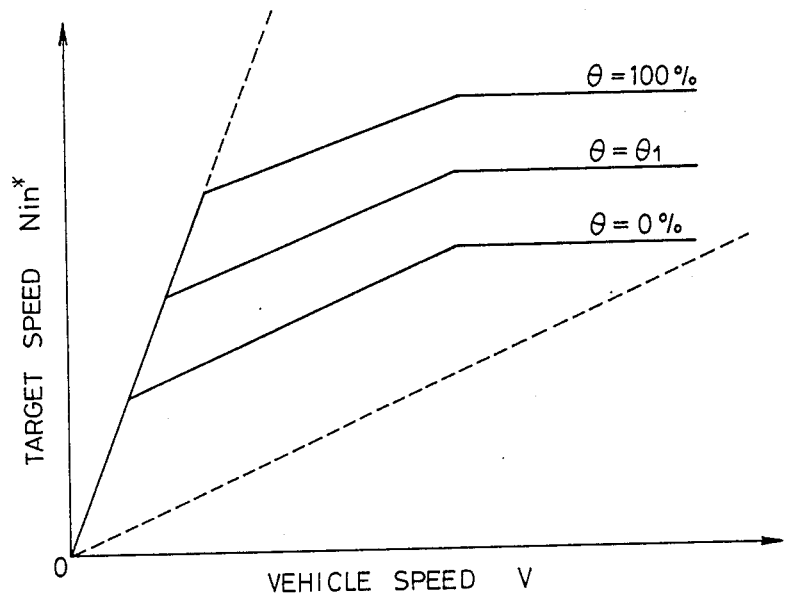
FIGS. 17, 18 and 19 are diagrams showing relationships used in the control routine of FIG. 15, for determining the target engine speed.

If the shift lever 66 is found to be in the ENGINE BRAKE position, the CPU 55 goes to step S43 to select a LOW-RANGE data map #1, from among a plurality of data maps stored in the ROM 56. The LOW-RANGE data map #1 represents a relationship as shown in FIG. 17. This LOW-RANGE data map #1 is prepared so as to determine the target speeds Nin* of the input shaft 16 suitable for running the vehicle at a comparatively large drive force and for providing an effective engine brake. That is, the target speeds Nin* to be determined according to the LOW-RANGE data map #1 are higher than those to be determined according to a LOW-RANGE data map #2 which will be described. Step S43 is followed by step S44 wherein the target speed Nin* is determined based on the vehicle speed V and the throttle opening angle $\theta$, according to the selected LOW-RANGE data map #1. Then, the CPU 55 goes to step S45 to operate the shift-direction and shift-speed control valves 74, 76 for continuously changing the speed ratio of the CVT 14 so that the actual speed Nin of the input shaft 16 coincides with the determined target speed Nin*.

Figure 16:
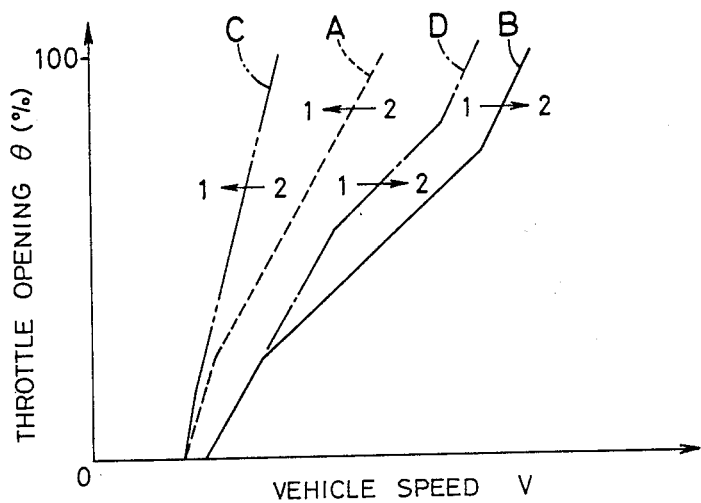
FIG. 16 is a view showing shift-up and shift-down patterns used in the control routine of FIG. 15, for automatic shifting operations of the auxiliary transmission.

In the case where the step S42 finds that the shift lever 66 is placed in the HIGH-SPEED DRIVE position, the CPU 55 goes to step S46 to check if the DRIVABILITY selector switch 82 is placed in the POWER DRIVE position or ECONOMY DRIVE position (to detect which one of the PWR and ECON pushbuttons 84, 86 is depressed). If the checking in step S46 reveals that the switch 82 is placed in the POWER DRIVE position with the PWR pushbutton 84 depressed, step S46 is followed by step S47 to select POWER DRIVE shift-down and shift-up patterns A and B as shown in FIG. 16, which are stored in the ROM 56. The shift-down pattern A is used as a shift-down boundary line to determine whether the auxiliary transmission 30 is shifted down from its high-range position to its low-range position. The shift-up pattern B is used as a shift-up boundary line to determine whether to shift the auxiliary transmission 30 from its low-range position to its high-range position. If the checking in step S46 indicates that the ECON pushbutton 86 is depressed to select the ECONOMY DRIVE position, step S46 is followed by step S48 to select ECONOMY DRIVE shift-down and shift-up patterns C and D as shown in FIG. 16, which are also stored in the ROM 56. These ECONOMY DRIVE shift patterns C and D are prepared to permit shift-down and shift-up operations of the auxiliary transmission 30 at lower vehicle speeds than those of the POWER DRIVE shift patterns A and B. It will be understood that means of executing steps S46, S47 and S48 consitute means for selecting the appropriate shift patterns from the memory means in the form of the ROM 56, depending upon the currently selected position of the DRIVABILITY selector switch 82.

Steps S47 and S48 are followed by step S49 in which the AUX. SHIFT solenoid valve 72 is operated to shift the auxiliary transmission 30 from the low-range position to the high-range position or vice versa, based on the vehicle speed V and the throttle opening angle $\theta$, according to the POWER DRIVE shift-down and shift-up patterns A and B, or the ECONOMY DRIVE shift-down and shift-up PATTERNS C and D, depending upon the position of the DRIVABILITY selector switch 82. As mentioned above, the shift patterns C and D are prepared to initiate the shifting operations at comparatively lower vehicle speeds, than the shift patterns A and B. In the ECONOMY DRIVE mode, therefore, the shift-down operation of the auxiliary transmission 30 is relatively retarded, and the fuel economy of the vehicle is improved. On the other hand, when the POWER DRIVE mode is established and the POWER DRIVE shift patterns A and B are used, the shift-down of the transmission 30 takes place at a relatively high vehicle speed, thus allowing the vehicle to run with comparatively high power.

Figure 18:
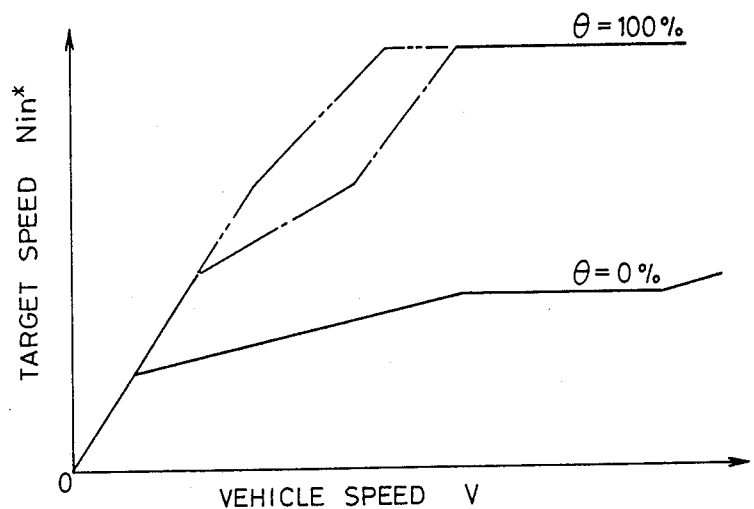
Figure 19:
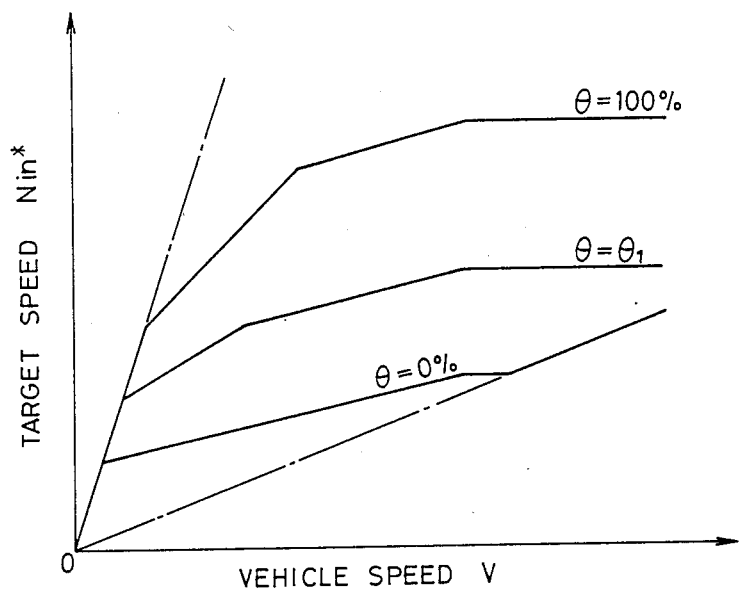

Subsequently, the CPU 55 goes to step S50 to check if the auxiliary transmission 30 is placed in the high-range position or in the low-range position. If the auxiliary transmission 30 is placed in the high-range position, step S50 is followed by step S51 to select a HIGH-RANGE data map stored in the ROM 56. This data map represents a relationship as shown in FIG. 18 If the checking in step S50 reveals that the auxiliary transmission 30 is placed in the low-range position, the CPU 55 executes step S52 to select the previously indicated LOW-RANGE data map #2 which represents a relation as shown in FIG. 19. Thus, it will be understood that means for executing steps S50, S51 and S52 constitute means for selecting the appropriate relationships (represented by the data maps stored in the ROM 56) between the target speed Nin*, and the vehicle speed and throttle opening angle, which relationships correspond to the high-range and low-range positions of the auxiliary transmission 30.

After the relationship or data map corresponding to the currently selected position of the transmission 30 has been selected in step S51 or S52, the CPU 55 goes to step S44 to determine the target speed Nin* based on the vehicle speed V and the throttle opening angle $\theta$, according to the selected relationship. Step S44 is followed by step S45 in which the shift-direction and shift-speed control valves 74, 76 are operated to change continuously the speed ratio of the CVT 14 so that the actual speed Nin of the input shaft 16 coincides with the determined target speed Nin*.

As indicated in FIG. 18, the HIGH-RANGE data map presents two different Nin*-V curves at the 100% throttle opening. When the DRIVABILITY selector switch 82 is placed in the POWER DRIVE position, the Nin*-V curve indicted in two-dot chain line is selected. When the ECONOMY DRIVE position is selected on the selector switch 82, the Nin*-V curve indicated in one-dot chain line is selected. In the ECONOMY DRIVE mode, therefore, the comparatively lower target speeds Nin* are used when the throttle opening angle is in a relatively high range (near the 100% level).

The steps of operation of the control routine of FIG. 15 are repeatedly executed while the vehicle is running. While the shift lever 66 is placed in the HIGH-SPEED DRIVE (D) position, the POWER DRIVE shift patterns A and B or the ECONOMY DRIVE shift patterns C and D are selected, depending upon the currently selected position (PWR or ECO) of the DRIVABILITY selector switch 82. The auxiliary transmission 30 is shifted between its two forward drive positions (low-range and high-range positions) according to the selected shift patterns. The ECONOMY DRIVE shift patterns C and D are prepared so that the shift-down and shift-up operations of the auxiliary transmission 30 take place at relatively low vehicle speeds, in order to attain comparatively high fuel economy of the vehicle. Consequently, while the DRIVABILITY selector switch 82 is in the ECONOMY DRIVE position with the ECON pushbutton 86 depressed, the overall speed ratio of the power transmitting system is changed within a comparatively narrow range, whereby the fuel economy is accordingly improved. On the other hand, the POWER DRIVE shift patterns A and B are prepared so that the shift-down and shift-up operations take place at relatively high vehicle speeds, in order to provide the vehicle with a comparatively large drive force. Therefore, while the POWER DRIVE mode is selected on the selector switch 82, the overall speed ratio of the power transmitting system is varied over a comparatively wide range. In this mode, the vehicle can be driven with comparatively high power.

In the present embodiment, the desired drivability mode, POWER DRIVE or ECONOMY DRIVE is selected by the vehicle drive with the DRIVABILITY selector switch 82. Therefore, the drive can expect the shift-down and shift-up characteristics of the auxiliary transmission. This is contrary to the unexpected automatic shift-down and shift-up operations according to the appropriate shift patterns, where the auxiliary transmission 30 is placed in an AUTO-SHIFT mode established by the shift lever 66 as in the preceding first and second embodiments. In this respect, the present embodiment assures an improved driving feel.

In the illustrated third embodiment, the DRIVABILITY selector switch 82 has two drivability mode positions, and the two different sets of shift pattern data are provided corresponding to the two drivability mode positions. However, the selector switch 82 may have three or more drivability mode position. In this case, the corresponding three or more sets of shift pattern data are provided.

While the present invention has been described in its preferred embodiments for illustrative purpose only, it is to be understood that the invention is by no means confined to the details of the illustrated embodiments, but may be otherwise embodied.

For example, the auxiliary transmission 30 which has two forward drive positions, i.e., low-range and high-range positions, may be modified to have three or more forward drive positions.

In the illustrated embodiments, the principle of the invention is applied to the auxiliary transmission 30 which is coupled to a continuously variable transmission of a belt-and-pulley type, in the form of the CVT 14 with the variable-diameter pulleys 22, 28 connected by the belt 20. However, the auxiliary transmission 30 may be used in combination with other types of continuously variable transmission.

While the illustrated embodiments use the throttle opening angle $\theta$ as a variable indicative of a currently required output of the engine 10, it is possible to use other variables such as an amount of depression of the accelerator pedal, or an amount or time of fuel injection of the engine 10.

Although the target speed Nin* of the input shaft 16 of the CVT 14 is determined, and the actual speed Nin of the input shaft 16 is controlled so as to coincide with the determined target speed Nin*, it is possible that the target speed Ne* of the engine 10 is determined and the actual engine speed Ne is controlled so as to coincide with the determined target engine speed Ne*.

What is claimed is:

1. A method of controlling a power transmitting system for an automotive vehicle, including a continuously variable transmission having an input shaft operatively connected to an engine of the vehicle, and further including an auxiliary transmission which is connected to the continuously variable transmission and which is automatically shifted from one of at least two forward drive positions thereof to the other depending upon operating conditions of the vehicle, comprising the steps of:

preparing a plurality of relationships of at least two variables which include a target speed of said input shaft of said continuously variable transmission, and a currently required output of the engine, said plurality of relationships corresponding to said at least two forward drive positions of said auxiliary transmission, and being determined so that when said auxiliary transmission is shifted down from one of said at least two forward drive positions to another of said at least two forward drive positions an actual speed of said engine does not exceed a predetermined maximum permissible speed after the auxiliary transmission is placed in said another of said at least two forward drive positions;

detecting currently selected one of said at least two forward drive positions of said auxiliary transmission;

selecting one of said plurality of relationships which corresponds to the detected currently selected forward drive position of said auxiliary transmission;

determining the target speed of said input shaft of said continuously variable transmission, according to the selected one of said plurality of relationships; and controlling a speed ratio of said continuously variable transmission so that an actual speed of said input shaft coincides with the determined target speed.

2. A method of controlling a power transmitting system according to claim 1, wherein said at least two forward drive positions of said auxiliary transmission includes a low-range position and a high-range position, said step of preparing a plurality of relationships comprising preparing a low-range relationship and a high-range relationship which correspond to said low-range and high-range positions, respectively, said high-range relationship being adapted to determine said target speed to be lower than that determined according to said low-range relationship, while said low-range relationship being adapted to determine said target speed to be higher than that determined according to said high-range relationship.

3. An apparatus for controlling a power transmitting system for an automotive vehicle, including a continuously variable transmission having an input shaft operatively connected to an engine of the vehicle, and further including an auxiliary transmission which is connected to the continuously variable transmission and which is automatically shifted from one of at least two forward drive positions thereof to the other depending upon operating conditioins of the vehicle, said apparatus comprising:

memory means for storing a plurality of relationships of at least two variables which include a target speed of said input shaft of said continuously variable transmission, and a currently required output of the engine, said plurality of relationships corresponding to said at least two forward drive positions of said auxiliary transmission, and being determined so that when said auxiliary transmission is shifted down from one of said at least two forward drive positions to another of said at least two forward drive positions an actual speed of said engine does not exceed a predetermined maximum permissible speed after the auxiliary transmission is placed in said another of said at least two forward drive positions;

means for detecting currently selected one of said at least two forward drive positions of said auxiliary transmission;

means for selecting one of said plurality of relationships which corresponds to the detected currently selected forward drive position of said auxiliary transmission;

means for determining the target speed of said input shaft of said continuously variable transmission, according to the selected one of said plurality of relationships; and means for controlling a speed ratio of said continuously variable transmission so that an actual speed of said input shaft coincides with the determined target speed.

4. An apparatus for controlling a power transmitting system according to claim 3, wherein said at least two variables further include a current running speed of the engine.

5. A method of controlling a power transmitting system for an automotive vehicle, including a continuously variable transmission having an input shaft operatively connected to an engine of the vehicle, and further including an auxiliary transmission which is connected to the continuously variable transmission and which is automatically shifted from one of at least two forward drive positions thereof to another depending upon operating conditions of the vehicle, said power transmitting system being provided with a selector device for selecting an operating mode of said auxiliary transmission, said selector device having an engine brake position for shifting down said auxiliary transmission from one of said at least two forward drive positions to another lower than said one drive position, said method comprising the steps of:

- preparing a plurality of relationships of at least two variables which includes a target speed of said input shaft of said continuously variable transmission, and a currently required output of the engine, said plurality of relationships corresponding to said at least two forward drive positions of said auxiliary transmission, and being determined so that when said auxiliary transmission is shifted down from one of said at least two forward drive positions to said another of said two forward drive positions an actual speed of said engine does not exceed a predetermined maximum permissible speed after the auxiliary transmission is placed in said another of said at least two forward drive positions;
- checking if said selector device is placed in said engine brake position;
- if said selector deviced is placed in said engine brake position, detecting currently selected one of said at least two forward drive positions of said auxiliary transmission;
- selecting one of said plurality of relationships which corresponds to the detected currently selected forward drive position of said auxiliary transmission;
- determining the target speed of said input shaft of said continuously variable transmission, according to the selected one of said plurality of relationships; and
- controlling a speed ratio of said continuously variable transmission so that an actual speed of said input shaft coincides with the determined target speed.

6. A method of controlling a power transmitting system according to claim 5, wherein said at least two forward drive positions of said auxiliary transmission includes a low-range position and a high-range position, said step of preparing a plurality of relationships comprising preparing a low-range relationship and a high-range relationship which correspond to said low-range and high-range positions, respectively, said high-range relationship being adapted to determine said target speed to be lower than that determined according to said low-range relationship, while said currently required output of said engine is in a relatively high range.

7. An apparatus for controlling a power transmitting system for an automotive vehicle, including a continuously variable transmission having an input shaft operatively connected to an engine of the vehicle, and further including an auxiliary transmission which is connected to the continuously variable transmission and which is automatically shifted from one of at least two forward drive positions thereof to another depending upon operating conditions of the vehicle, said power transmitting system being provided with a selector device for selecting an operating mode of said auxiliary transmission, said selector device having an engine brake position for shifting down said auxiliary transmission from one of said at least two forward drive positions to another which is lower than said one drive position, said apparatus comprising:

- memory means for storing a plurality of relationships of at least two variables which include a target speed of said input shaft of said continuously variable transmission, and a currently required output of the engine, said plurality of relationships corresponding to said at least two forward drive positions of said auxiliary transmission, and being determined so that when said auxiliary transmission is shifted down from one of said at least two forward drive positions to another of said at least two forward drive positions an actual speed of said engine does not exceed a predetermined maximum permissible speed after the auxiliary transmission is placed in said another of said at least two forward drive positions;
- means for checking if said selector device is placed in said engine brake position;
- means for detecting currently selected one of said at least two forward drive positions of said auxiliary transmission, if said selector device is placed in said engine brake position;
- means for selecting one of said plurality of relationships which corresponds to the detected currently selected forward drive position of said auxiliary transmission;
- means for determining the target speed of said input shaft of said continuously variable transmission, according to the selected one of said plurality of relationships; and
- means for controlling a speed ratio of said continuously variable transmission so that an actual speed of said input shaft coincides with the determined target speed.

8. An apparatus for controlling a power transmitting system according to claim 4, further comprising:

- a drivability selector for selecting one of a plurality of drivability modes of the vehicle;
- memory means for storing a plurality of shift pattern data sets each of which represents a relationship of at least two variables such as a running speed of the vehicle and said currently required output of the engine, said plurality of shift pattern data sets corresponding to said plurality of drivability modes of the vehicle;
- means for selecting one of said plurality of shift pattern data sets which corresponds to the drivability mode selected by said drivability selector; and
- control means for shifting said auxiliary transmission from one of said at least two forward drive positions to the other, according to the selected shift pattern data set.

9. A method of controlling a power transmitting system for an automotive vehicle, including a continuously variable transmission having an input shaft operatively connected to an engine of the vehicle, and further including an auxiliary transmission which is connected to the continuously variable transmission and which is automatically shifted from one of at least two forward drive positions thereof to the other depending upon operating conditions of the vehicle, comprising the steps of:

- providing said power transmitting system with a selector device for selecting an operating mode of said auxiliary transmission, said selector device having a high-speed drive position in which said auxiliary transmission is always placed in said high-range position, and an auto-shift position in which said at least two forward drive positions are automatically selected;

preparing a plurality of relationships of at least two variables which include a target speed of said input shaft of said continuously variable transmission, and a currently required output of the engine, said plurality of relationships corresponding to said at least two forward drive positions of said auxiliary transmission, said plurality of relationships including two different relationships which correspond to said high-range position of said auxiliary transmission;

detecting currently selected one of said at least two forward drive positions of said auxiliary transmission;

selecting one of said plurality of relationships which corresponds to the detected currently selected forward drive position of said auxiliary transmission, such that one of said two different relationships is selected when said high-range position is selected while said selector device is placed in said high-speed drive position, and such that the other of said two different relationships is selected when said high-range position is selected while said selector device is placed in said autoshift position;

determining the target speed of said input shaft of said continuously variable transmission, according to the selected one of said plurality of relationships; and controlling a speed ratio of said continuously variable transmission so that an actual speed of said input shaft coincides with the determined target speed

* * * * *